INVENTORS
JOHN P. KNAUTH
KENNETH R. LANG
BY Richard von K. Bruns
Attorney

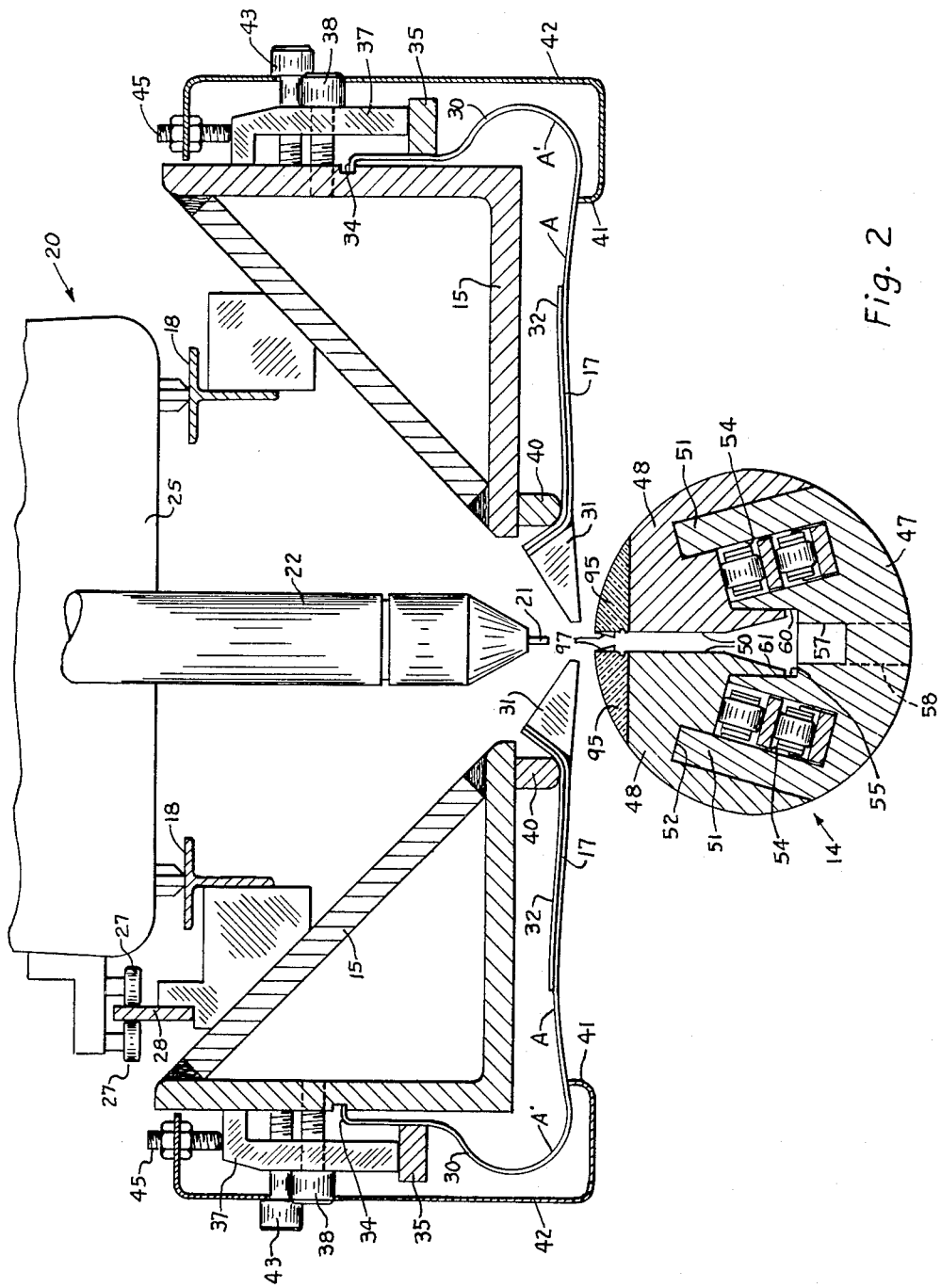

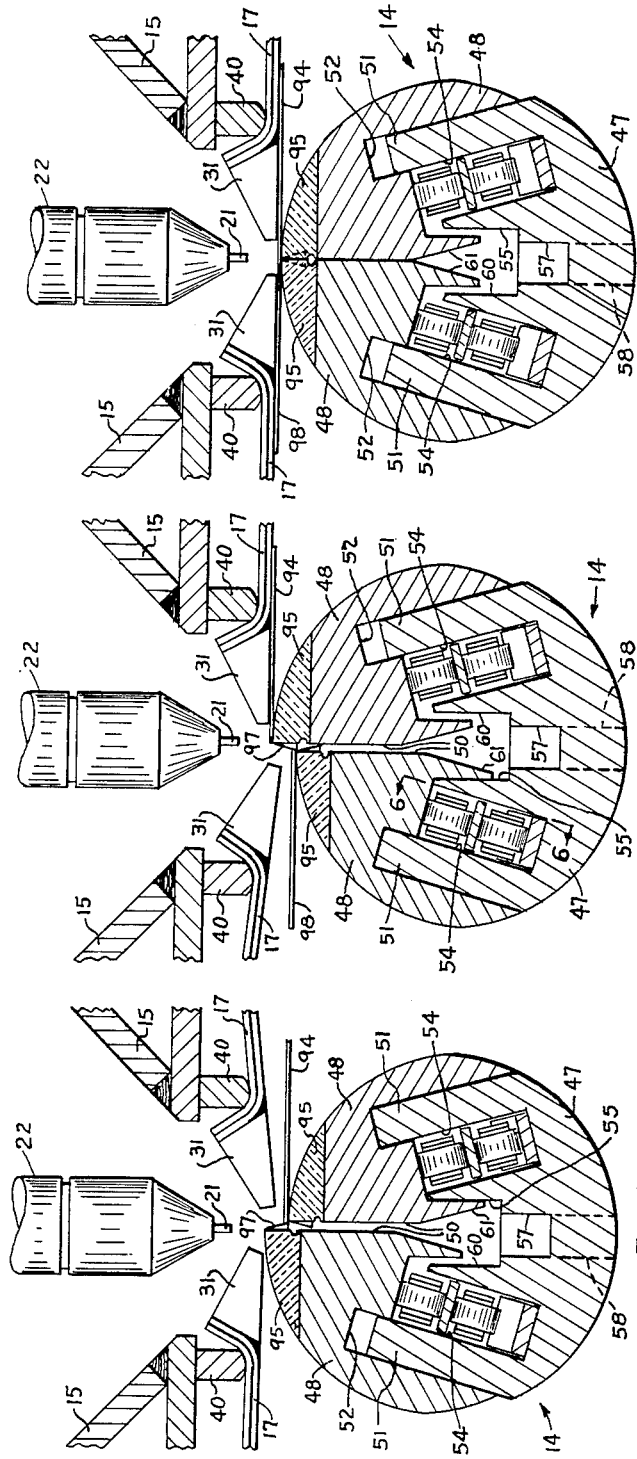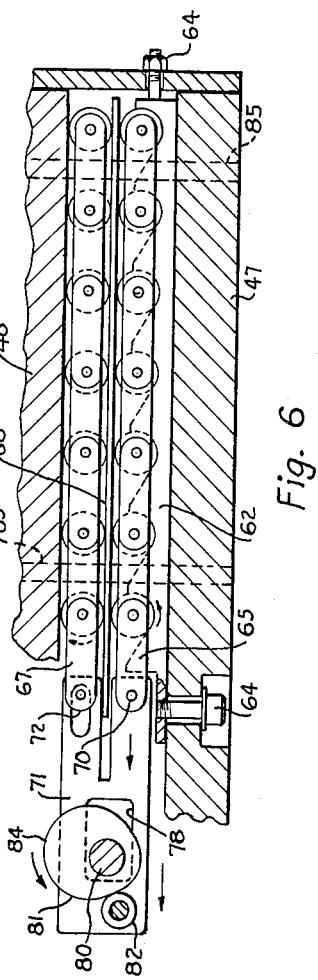

United States Patent Office 2,740,877
Patented Apr. 3, 1956

2,740,877

WELDING APPARATUS

John P. Knauth, Skaneateles, and Kenneth R. Lang, Liverpool, N. Y., assignors to Syracuse Special Machine Company, Inc., Syracuse, N. Y., a corporation of New York Application November 10, 1953, Serial No. 391,220

13 Claims. (Cl. 219—17)

This invention relates to welding apparatus, and has particular reference to a novel seam welding machine of the horn type.

In conventional seam welding machines, sheet metal work pieces to be joined by welding are clamped in the machine in edge abutting relation beneath a movable welding electrode which then travels along the seam to effect the weld. The operation is similar in the case of seam welding pipe except that a single preformed pipe blank is substituted for the sheet metal work pieces and the confronting edges of the blank are clamped in abutting relation to form the seam to be welded. In every application, as is well-known in the art, it is necessary to firmly clamp the work pieces or piece securely in position with the edges to be joined in close contact in order to insure a strong and uniform weld.

Heretofore, the clamping structure in most seam welding machines has comprised a fixed anvil or platen which supports the work pieces, and some type of pivotable clamping members mounted above the anvil which can be swung into engagement with the work pieces to hold them against the anvil in welding position. This conventional arrangement has several disadvantages, and probably the most serious of these is that as the clamping members are moved into engagement with the work pieces they not only exert a downward clamping force but also a slight transverse force in an outward direction which tends to move the work pieces apart so that the confronting edges to be joined are not really in close contact and a strong weld can not be effected in an efficient manner. This undesirable result is due to the fact that the pivotal axis for the clamping member or set of members for each work piece is located above the piece and the force which causes the pivotal movement is applied to the member from above the work piece so that the member has both downward and outward components of force as it acts upon the piece.

A further disadvantage frequently noted in conventional clamping structure of the above-described type is that no adequate means are provided to insure that the work pieces will always be secured in the machine so that the seam to be welded coincides with the path travelled by the electrode. Obviously, if the positioning of the pieces is not always the same and the seam does not lie in the path of the electrode, a proper weld can not be effected. Another undesirable feature sometimes encountered is that the clamping members themselves, or associated equipment, obstruct a full view of the seam making it difficult for the machine operator to observe the welding operation.

In order to overcome some of the aforementioned disadvantages of conventional welding machines, the present invention provides a seam welding machine having a unique work piece clamping arrangement which utilizes a pair of movable anvil or backing members to raise the work pieces into engagement with a pair of oppositely disposed banks of clamping fingers thereby causing the latter to pivot or swing about a fulcrum in such a manner that the pieces are urged into close abutting contact during the clamping operation. The movable backing members are mounted on a stationary horn member and are individually operable so that each in turn can be elevated to act as a stop for one of the opposing work pieces thereby insuring proper alignment of the seam with the path of the electrode at all times. These members are raised and lowered along oblique paths so that they are in contact when in clamping position and spaced apart when in repose which construction, among other things, permits residual flux and other residual impurities to drop between the members and out of the machine as the former are lowered into reposed position after a welding operation. The individual clamping fingers in each bank are narrow resiliently mounted elements and are closely spaced so that there is positive clamping action on the work pieces throughout the entire length of the seam. In addition, the arrangement of these fingers is such that the machine operator has an unobstructed view of the seam being welded at all times.

With the foregoing and other considerations in view, the broad objective of the present invention is to provide a seam welding machine having a greatly improved work piece positioning and clamping structure.

A more specific object of the invention is to provide a seam welding machine wherein the work pieces to be welded are urged into close edge abutting relation while being clamped in welding position.

Another specific object of the invention is to provide a seam welding machine wherein the clamping structure includes banks of clamping fingers which are moved into clamping position by forces applied from below the welding position of the work pieces.

A further specific object of the invention is to provide a seam welding machine wherein the fingers comprising the clamping finger banks are resiliently mounted and are adapted when actuated to move about a fulcrum with an inward component of force.

A still further object of the invention is to provide a seam welding machine wherein the work pieces are elevated into clamping engagement with the banks of clamping fingers by a pair of movable backing members.

Another object of the invention is to provide a seam welding machine wherein the movable backing members may be individually operated to act as positioning stops for the opposing work pieces.

Still another object of the invention is to provide a seam welding machine wherein the work pieces are always clamped in the machine with the seam to be welded in alignment with the path of the welding electrode.

A further object of the present invention is to provide a seam welding machine wherein the movable backing members are spaced apart in repose to permit residual flux and other residual impurities to pass therebetween after a welding operation.

Another object of the present invention is to provide a seam welding machine wherein the work pieces are positively engaged by the clamping structure for the entire length of the seam.

A further object of the invention is to provide a seam welding machine wherein the machine operator has an unobstructed view of the seam being welded at all times.

A still further object of the invention is to provide a seam welding machine which is simple and efficient to operate, and which produces uniformly strong welds.

Other objects and advantages of the invention will become apparent from the following detailed description read in conjunction with the accompanying drawings wherein like reference numbers designate corresponding parts in all the views.

In the drawings—

Figure 2 is a transverse vertical section taken along line 2—2 of Figure 1;

Figure 3 is a partial section similar to Figure 2 showing one of the backing members in elevated position to act as a stop for a work piece being initially positioned in the machine;

Figure 4 is a partial section similar to Figure 2 showing one work piece clamped in welding position and the opposing work piece being initially positioned in the machine;

Figure 5 is a partial section similar to Figure 2 showing both work pieces clamped in welding position; and Figure 6 is a longitudinal vertical section taken along line 6—6 of Figure 4.

Figure 1:
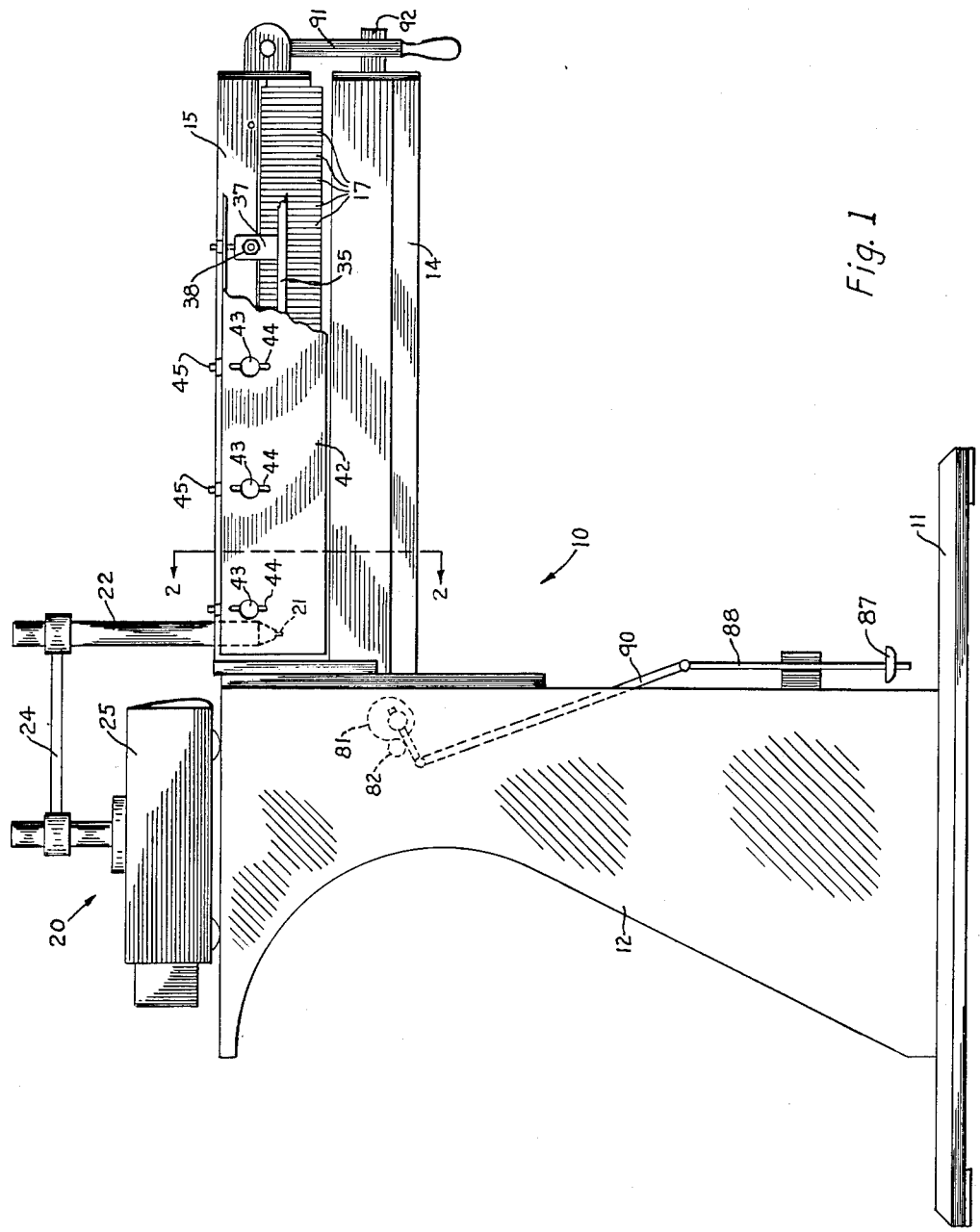
Figure 1 is a side elevation, partially broken away, of a seam welding machine embodying the present invention.

Having reference now to the drawings, which illustrate a typical embodiment of the invention for the purpose of disclosure, Figure 1 shows a seam welding machine, generally indicated at 10, having a base 11, an upright supporting column 12, a horizontal horn assembly 14 supported by column 12 and a pair of parallel, horizontal arm elements 15 (only one of which is shown in Figure 1) also supported by the column 12. Arm elements 15, which are triangular in cross section, Figure 2, support the clamping fingers 17 and parallel rails 18 upon which a conventional carriage type welding unit 20 travels in a reciprocating path.

Welding unit 20 may be any one of a number of automatically operated types and includes the usual welding torch, wire feeder and associated equipment. The electrode 21 is fed through a guide 22 supported by an arm 24 mounted on the carriage 25. Guide 22 is adjustable up or down, and towards or away from the carriage, but aways travels in a longitudinal path midway between the arms 15 and banks of clamping fingers 17 supported thereon. The carriage 25 is kept on the rails and in a constant path by means of a pair of depending rollers 27 which engage a machined guide bar 28 mounted in exact parallel relation to the vertical plane extending midway between the arms.

Each arm 15 supports a bank of clamping fingers 17 extending along the full length of the arm, the fingers being relatively narrow and mounted in closely spaced relation as is best shown in Figure 1. Each finger 17 comprises a resilient spring member or lever 30 having substantially the conformation of a reverse curve and terminating at its inner end with a pressure pad 31 of high heat conducting material such as copper. The finger also includes a reinforcing and wear member 32 rigidly secured to the inner end portion of the lever 30. The outer ends of fingers 27 are turned inwardly as at 34 and are received in a longitudinally extending groove in the arm 15. A retaining bar 35 which extends the full length of arm 15 bears against each finger to secure it in position on the arm. Retaining bar 35 is formed with a plurality of spaced upstanding lugs 37 firmly secured to the arm as by bolts 38.

Depending from each arm 15 adjacent the inner edge thereof is a fulcrum bar 40 which engages each finger 17 at the juncture of its pressure pad 31 and lever 30. The retaining bar 35 and spring bias of the reverse curve A—A' of each finger cause the fingers to normally bear against the fulcrum bar, the pressure pads 31 extending inwardly therebeyond in a slightly downward direction as shown. In order to insure that each finger will bear with uniform pressure against fulcrum bar 40, the fingers are engaged at identical points by the upstanding flange 41 of a tensioning bar 42 which extends the full length of the arm 15. Bar 42 is rigidly secured to arm 15 as by bolts 43 which pass through longitudinally spaced slots 44 in the bar and are threaded into the arm. The slots 44 permit the vertical position of bars 42 to be adjusted by set screws 45 so that the amount of tension exerted upon the fingers 17 can be varied.

The horn assembly 14 is located below the arms 15 with its longitudinal axis lying within the vertical plane extending midway between the arms. Thus, the center line of the electrode 21, if extended, would intersect the axis of the horn assembly at every point on the path travelled by the electrode. The horn assembly comprises a stationary horn member 47 and a pair of movable backing members or jaws 48 mounted thereupon. Backing members 48 can be raised and lowered with respect to the stationary member 47, and as each member 48 is raised it moves upwardly and inwardly on an oblique path so that when both members are fully elevated their converging paths bring them into contact with their inner vertical faces 50 in abutting relation as shown in Figure 5. In this fully elevated or work piece clamping position, the plane of contact of the two backing members is coplanar with the vertical plane extending midway between arms 15. As each backing member 48 is lowered it moves downwardly and outwardly in the same oblique path so that when both members are fully lowered or in reposed position they are spaced apart as shown in Figure 2.

Backing members 48 are guided in their oblique paths of movement by inwardly inclined longitudinal flanges 51 on the stationary horn member 47, which flanges are respectively received in corresponding channels 52 in the backing members. Inwardly of the flanges 51 on the horn member 47 are a pair of inclined channels 54 which respectively house the movement actuating mechanism for each backing member, and located centrally between channels 54 is a vertical sided channel 55 communicating with a narrower channel 57 directly therebelow. A series of apertures 58 communicate with the bottom of channel 57 and extend through the bottom of horn member 47 to permit residual welding flux and other residual impurities to drop out of the machine as will be more fully explained hereinafter. The channels 54 are separated from the central channel 55 by tapered walls or flanges 60, and the vertical side of each of these walls is engaged by a guide flange 61 on the inner side of each backing member 48 when the latter are in repose as shown in Figure 2.

The actuating mechanism for each backing member, Figures 3 and 6, comprises a rack 62 secured as by bolts 64 to the bottom of channel 54, a roller chain 65 positioned on the rack, a second roller chain 67 bearing against the backing member, and an idler plate 68 positioned between the two roller chains. Rack engaging chain 65 is pivotally secured at 70, Figure 6, to a drive plate 71, while backing member engaging chain 67 is secured to the same plate by a lost motion connection 72. Drive plate 71 is formed with an aperture 78 through which a cam shaft 80 passes. Cam shaft 80 carries a cam 81 which engages an idler roller 82 on the plate, and as the cam is rotated in a counterclockwise direction the cam lobe 84 forces roller 82 and the drive plate to the left. As the plate moves to the left, it moves chain 65 to the left causing its rollers to ride up the inclined planes of the rack 62. The rollers rotate in a counterclockwise direction during this movement and thereby impart a leftward movement to the idler plate 68 which causes the rollers of upper roller chain 67 to rotate in a clockwise direction. As the rollers of chain 65 ride up the inclined planes of the rack they elevate the idler plate and upper chain 67 causing the backing member to be elevated. Since any longitudinal movement in the backing member is undesirable, such movement is prevented by means of guide and slot connections indicated at 85 between the member and stationary horn 47. Thus, it will be seen that, while the chains and idler plate move both upwardly and to the left, only the upward component of force can affect the backing member. However, since the rollers of upper chain 67 rotate in a clockwise direction during the movement, the leftward movement of the chain relative to the backing member results in negligible frictional losses. The cam shaft 80 may be provided with suitable mechanism to maintain the cam lobe 84 in engagement with the roller 82 to hold the backing member in elevated position during the welding operation, and thereafter the shaft may be further rotated to allow the chains and idler plate to move to the right and downwardly, and the backing member to be lowered. The weight of the backing member and chains will normally cause the rollers of chain 65 to roll back down the inclined planes of the rack when the cam lobe moves off the idler roller, but the return or lowering movement can be made positive if desired by spring means secured to the lower roller chain, for example. The cam shaft 80 and its cam 81 may be actuated by any suitable mechanical, electrical, pneumatic or hydraulic means. Figure 1 diagrammatically illustrates a simple mechanical linkage for one of the backing members wherein a foot pedal 87 operates through a linkage 88, 90, to actuate the cam 81.

The operation of the machine is as follows: A yoke member 91, Figure 1, secured between arms 15 is lowered into locking position with a clasp 92 on the horn assembly 14 to rigidly interlock all three members and insure proper alignment therebetween. Thereafter, one of the backing members 48 is elevated, as for example the left hand member in Figure 3, and a work piece 94 is positioned on the right hand, lowered backing member with its edge against the elevated member, the latter acting as a stop. The backing members 48 are provided with work piece engaging plates 95 of high heat conducting material such as copper and each plate is provided with a plurality of teeth 97, the teeth of one plate being offset with respect to the teeth of the other, and each plate having a plurality of slots to receive the teeth of the opposite plate when the two plates are brought into abutting relation. The work piece, therefore, is actually positioned against the teeth 97 of the elevated member, and these teeth are provided because the edge of the work piece can more easily ride up against the inclined edges thereof than against the vertical inner face of the backing member as the work piece is being elevated.

Having positioned work piece 94 with its edge against the teeth 97 of the left hand, elevated backing member, the right hand backing member is elevated moving the work piece up into engagement with the right hand bank of clamping fingers 17. Thereafter, the upward movement continues and also moves the clamping fingers until they extend horizontally from the fulcrum 40 as shown in Figure 4, at which time the backing member is in fully elevated position and the work piece is firmly clamped between the member and clamping fingers. When the work piece 94, being elevated by the backing member, has engaged and thereafter begins to move the clamping fingers, the upward force applied to the pressure pad 31 of each finger, inwardly of the fulcrum 40, causes the pad and finger to slide or pivot about the fulcrum in an upward direction which causes the curve at A of the finger to straighten out thereby imparting an additional inward movement to the pad and finger. This inward component of force is generally lacking in the prior art, as previously noted, because the force applied to the clamping members thereof is from above the members rather than below and the members are not arranged to slide about a fulcrum element, as herein described. The inward movement of the pressure pads 31 is transmitted to the work piece so that, while both the work piece and backing member are out of alignment with the path of the electrode when the former is initially positioned in the machine, Figure 3, the work piece ends up with its edge on the center line of the electrode when the backing member is in fully elevated position as shown in Figure 4.

When the right hand work piece 94 has been clamped in welding position as above described, the left hand backing member is lowered and a second work piece 98 is positioned thereupon with its edge in engagement with the teeth 97 of the elevated right hand member, Figure 4, the right hand member now serving as the positioning stop. Thereafter, the left hand backing member is elevated bringing work piece 98 into engagement with the left hand bank of clamping fingers 17 which urge the work piece into close edge abutting contact with the previously clamped work piece 94, Figure 5. The work pieces are then securely clamped in proper welding position and the electrode 21 travels along the seam to effect the weld in the usual manner. When the weld has been completed, the backing members are lowered to unclamp the work, and the yoke member 91 is unclasped and raised to permit the work to be removed from the machine. At this time, any residual welding flux or other residual impurities are permitted to drop between the spaced apart, lowered backing members, through the channel 57 and out of the machine.

While the operation of the invention has been described in connection with sheet metal work pieces, the invention may be used equally well for seam welding pipe and the like, and the general circular cross section of the horn assembly is particularly well adapted for such work.

It should also be pointed out the invention is well adapted for seam welding contoured work pieces. In such case, the work piece engaging surfaces of the backing members and the fulcrum bars may be formed to follow the contour of the pieces to be welded, and the pieces will be as securely clamped as in the illustration above-described because the closely spaced, narrow clamping fingers can follow the contour and still positively engage the pieces for the entire length of the seam to be welded. In this application, the electrode may be guided over the contoured seam by a guide bar having the same contour as the fulcrum bars and backing members.

From the foregoing description it will be apparent that the invention provides a novel and highly useful work piece positioning and clamping arrangement for seam welding machines or other machines wherein it may be desirable to clamp work pieces in close abutting engagement. The novel action of the clamping fingers in connection with that of the individually movable backing members insures such close abutting engagement and at the same time insures that the seam of the work pieces will always be located in the same position. In addition, the lack of clamping finger actuating mechanism above the fingers permits an unobstructed view of the seam at all times. The invention may be embodied in other specific forms without departing from the spirit or essential characteristics thereof. The embodiment disclosed is therefore to be considered in all respects as illustrative rather than restrictive, the scope of the invention being indicated by the appended claims.

What we claim is:

1. In a seam welding machine: a pair of parallel, oppositely disposed rows of narrow clamping fingers; a stationary horn member located centrally below said rows of fingers; and a pair of backing members slidably mounted on said horn member, each of said backing members being independently movable upwardly towards one of said rows of fingers to coact therewith in clamping a work piece in seam welding position.

2. In a seam welding machine: a pair of parallel, oppositely disposed rows of clamping fingers; a stationary horn member centrally located below said rows of fingers; and a pair of backing members slidably mounted on said horn member and individually operable to coact with said rows of fingers to clamp a pair of sheet metal work pieces in seam welding position, said backing members being spaced apart in reposed position and moving into edgewise engagement when coacting with said rows of fingers.

3. In a seam welding machine: a pair of parallel, oppositely disposed rows of clamping fingers; a stationary horn member centrally located below said rows of fingers; a pair of movable backing members mounted on said horn member; and means to move said backing members upwardly and inwardly on converging oblique paths towards said rows of fingers to coact therewith in clamping a pair of work pieces in seam welding position, said backing members being spaced apart when in lowered reposed position and converging at the line of the seam to be welded when in elevated clamping position.

4. Structure as defined in claim 3 wherein said backing members are spaced apart in reposed position to permit residual welding flux and other residual impurities to fall freely therebetween; and said stationary horn member is formed with apertures through the bottom thereof to permit said flux and impurities to pass out of the machine therethrough.

5. In a seam welding machine: a pair of parallel, oppositely disposed rows of clamping fingers; a stationary horn member centrally located below said rows of fingers; a pair of movable backing members mounted on said horn member and individually operable to coact with said rows of fingers to clamp a pair of sheet metal work pieces in seam welding position; means to raise one of said backing members towards one of said rows of fingers to permit said member to act as a stop for a work piece positioned on the second backing member; and means to raise said second backing member and work piece positioned thereon towards the other of said rows of fingers to clamp said work piece between said fingers and member; said first-named means being operable thereafter to lower said first-named backing member and permit a work piece to be positioned thereon with said elevated second backing member acting as a stop; said first-named means being thereafter again operable to raise said first-named backing member and work piece positioned thereon towards said first-named row of fingers to clamp said work piece between said fingers and member in edge abutting relation with the previously elevated work piece.

6. Structure as defined in claim 5 wherein the means to raise and lower each backing member includes a saw-toothed rack on said horn member; a roller chain engaging said track; an idler plate engaging said roller chain; and a second roller chain engaging said idler plate and the backing member; and means to apply a longitudinal force to the chain engaging said rack.

7. In a seam welding machine: a pair of parallel, rigidly mounted arm elements arranged to permit a welding electrode to travel longitudinally midway therebetween; a bank of clamping fingers mounted on each of said arm elements so that the inner end of each finger is positioned on a line parallel to and adjacent the line of travel of said electrode; a fulcrum bar mounted on each arm element engaging the bank of fingers mounted on said element adjacent the inner ends of the fingers; and means to apply a force from below said fingers to the inner ends thereof to move them about said fulcrum bars in an upward direction.

8. In a seam welding machine: a pair of parallel, rigidly mounted arm elements arranged to permit a welding electrode to travel in a reciprocating longitudinal path midway therebetween; a row of clamping fingers resiliently mounted below each of said arm elements; each of said fingers terminating at its inner end in a pressure pad element positioned adjacent the line of travel of said electrode; a fulcrum bar depending from each arm element engaging the row of fingers mounted below said element at the juncture of said pad elements with said fingers; and means positioned below said rows of fingers to move work pieces into engagement with said pad elements and thereafter move said work pieces and elements whereby the latter are shifted about their fulcrum bars with an upward direction of movement causing said work pieces to be securely held by the coaction of said elements and means.

9. In a seam welding machine: a pair of parallel, rigidly mounted arm elements arranged to permit a welding electrode to travel longitudinally midway therebetween; a bank of clamping fingers mounted on each of said arm elements, each of said fingers including a resilient spring member terminating at its inner end in a pressure pad element positioned adjacent the line of travel of said electrode; tensioning means on each arm element engaging the bank of fingers mounted thereon; a fulcrum bar mounted on each arm element; said resilient spring members coacting with said tensioning means to cause the fingers of each bank to bear against their corresponding fulcrum bar with the pad elements thereof extending in a slight downwardly inclined direction therebeyond; and means to apply a force from below said banks of fingers to the pad elements thereof and move them in an upward direction about said fulcrum bars.

10. In a seam welding machine: a pair of parallel, rigidly mounted arm elements arranged to permit a welding electrode to travel in a reciprocating longitudinal path midway therebetween; a row of clamping fingers resiliently mounted below each of said arm elements; each of said fingers including a spring member having a reverse curve portion and a pressure pad element mounted on said member beyond said curve portion adjacent the line of travel of said electrode; a fulcrum bar depending from each arm element engaging the row of fingers mounted below said element at the juncture of said pad elements and spring members; a stationary horn element located centrally below said rows of fingers; and a pair of backing members slidably mounted on said horn member and operable to raise a pair of work pieces into engagement with said pad elements whereby the latter are shifted about their fulcrum bars, upwardly and inwardly towards the line of travel of said electrode, causing said work pieces to be moved into close edgewise abutment and securely held in such position for a seam welding operation, said inward movement of said pad elements being due to the straightening of the reverse curve portions of said spring members as said pad elements are moved upwardly, said inward movement of said pad elements being transmitted to the work pieces in engagement therewith to cause said pieces to be moved into edgewise abutment.

11. In a welding machine: a welding horn assembly comprising a fixed, elongated horn member; a pair of movable, elongated backing members carried by said horn member, said backing members being normally supported by said horn member in parallel spaced relation; and means to individually move each backing member upwardly and inwardly on an oblique path whereby said members are moved into abutting relation upon the termination of such movement.

12. Structure as defined in claim 11 wherein said backing member moving means includes a saw tooth rack on said horn member; a roller chain engaging said rack; an idler plate engaging said roller chain; a second roller chain engaging said idler plate and backing member; and means to apply a longitudinal force to the chain engaging said rack.

13. In a welding machine: a work piece clamping fixture comprising a support element; a fulcrum bar depending from said support element; a resilient clamping finger formed with a reverse curve portion mounted on said support element beneath said fulcrum bar and resiliently bearing thereagainst, a portion of said finger extending beyond said bar to a point adjacent the point of welding; said finger extension being adapted, upon the application of an upward force thereto, to move about said fulcrum bar upwardly and inwardly towards the point of welding, said inward component of the movement being caused by the straightening of said reverse curve portion upon the application of the upward force.

References Cited in the file of this patent

UNITED STATES PATENTS

| | | |
|---|---|---|
| 1,922,249 | Koch | Aug. 15, 1933 |
| 2,304,824 | Hothersall | Dec. 15, 1942 |
| 2,634,354 | Trombley | Apr. 7, 1953 |